United States Patent
Nonaka et al.

(10) Patent No.: US 7,006,424 B2
(45) Date of Patent: Feb. 28, 2006

(54) INFORMATION RECORDING/REPRODUCING SYSTEM, MUSIC RECORDING/REPRODUCING SYSTEM, INFORMATION RECORDED MEDIUM AND MUSIC RECORDING/REPRODUCING METHOD

(75) Inventors: Yoshiya Nonaka, Kawagoe (JP); Ryoji Sugino, Tokyo-to (JP)

(73) Assignees: Pioneer Corporation, Tokyo-to (JP); Tech Experts Incorporation, Tokyo-to (JP)

( * ) Notice: Subject to any disclaimer, the term of this patent is extended or adjusted under 35 U.S.C. 154(b) by 442 days.

(21) Appl. No.: 10/430,329

(22) Filed: May 7, 2003

(65) Prior Publication Data

US 2003/0225467 A1    Dec. 4, 2003

(30) Foreign Application Priority Data

May 31, 2002    (JP)    ............................ P2002-158791

(51) Int. Cl.
*G11B 5/09*    (2006.01)
(52) U.S. Cl. .................. 369/84; 369/47.12; 369/47.13; 369/53.21; 369/83
(58) Field of Classification Search ..................... None
See application file for complete search history.

(56) References Cited

U.S. PATENT DOCUMENTS

| 6,396,998 B1 * | 5/2002 | Nozaki et al. ................. 386/52 |
| 6,842,418 B1 * | 1/2005 | Sato et al. ..................... 369/84 |
| 6,937,553 B1 * | 8/2005 | Mitui et al. ................... 369/84 |

* cited by examiner

*Primary Examiner*—Muhammad Edun
(74) *Attorney, Agent, or Firm*—Sughrue Mion, PLLC

(57) ABSTRACT

An information recording/reproducing system has an information recording/reproducing apparatus and a portable information recording/reproducing apparatus. The information recording/reproducing apparatus has: an information copying device which, when predetermined a piece of program information is reproduced from a first recording medium, copies the piece of program information and at least one piece of program information to be subsequently reproduced, from the first recording medium to the second recording medium, and an information erasing and copying device which, when the reproducing of the piece of program information is ended, erases the piece of program information from the second recording medium, and then newly copies a piece of program information to be reproduced after said at least one piece of program information, from the first recording medium to the second recording medium.

17 Claims, 4 Drawing Sheets

INFORMATION RECORDING/REPRODUCING SYSTEM, MUSIC RECORDING/REPRODUCING SYSTEM, INFORMATION RECORDED MEDIUM AND MUSIC RECORDING/REPRODUCING METHOD

BACKGROUND OF THE INVENTION

1. Field of the Invention

The present invention relates to an audio system equipped with a detachable operation panel. In particular, it relates to technology for recording program information on a detachable operation panel which can be used as a portable player.

2. Description of the Related Art

In-vehicle audio systems equipped with a detachable operation panel have been known recently. The detachable operation panel of such in-vehicle audio system contains a flash memory for recording program information (e.g., music data), a microcomputer for reading music data from the flash memory and reproducing, etc. This allows the user to remove the detachable operation panel from the body of the system and use it as a portable player. For example, when getting off the vehicle, the user selects, on the detachable operation panel, a few desired music data from a music-data record medium (e.g., HD (hard disk)) built into the body, records them in the flash memory, and then removes the detachable operation panel from the body to carry it as a portable player.

However, it is bothersome for the user to select a few desired music data(e.g., music data the user was listening to or was about to listen to in the vehicle) from the music-data record medium and record them in the flash memory using the detachable operation panel, and is very troublesome especially when the user is in a hurry.

SUMMARY OF THE INVENTION

It is therefore an object of the present invention to provide a more convenient information recording/reproducing system, a music recording/reproducing system, and music recording/reproducing method, etc. capable of reducing troublesome user tasks.

The above object of the present invention can be achieved by an information recording/reproducing system provided with: an information recording/reproducing apparatus having a first reproducing control device which controls reproducing of a plurality of pieces of program information recorded on a first recording medium; and a portable information recording/reproducing apparatus which has a second recording medium and a second reproducing control device which controls reproducing of a plurality of pieces of program information recorded on the second recording medium, and which is detachably connected with the information recording/reproducing apparatus, wherein the information recording/reproducing apparatus comprises: an information copying device which, when predetermined a piece of program information is reproduced from the first recording medium, copies the piece of program information and at least one piece of program information to be subsequently reproduced, from the first recording medium to the second recording medium, and an information erasing and copying device which, when the reproducing of the piece of program information is ended, erases the piece of program information from the second recording medium, and then newly copies a piece of program information to be reproduced after said at least one piece of program information, from the first recording medium to the second recording medium.

According to the present invention, the program information to be reproduced is copied from the first recording medium to the second recording medium in such a way that the program information recorded on the second recording medium is replaced in time with the end of reproducing of program information. Consequently, for example, when the user stops reproducing (playingback) program information from the first recording medium, removes the portable information recording/reproducing apparatus from the information recording/reproducing apparatus, and uses it as a portable player, there is no need for the user to select the program information he/she intends to reproduce and record it on the second recording medium and the user can reproduce (play back) it easily from the portable information recording/reproducing apparatus. Thus, this invention can reduce troublesome user tasks and improve convenience.

The above object of the present invention can be achieved by an information recording/reproducing system provided with: an information recording/reproducing apparatus having a first reproducing control device which controls reproducing of a plurality of pieces of program information recorded on a first recording medium; and a portable information recording/reproducing apparatus which has a second recording medium for recording a piece of program information currently being reproduced from the first recording medium and at least one piece of program information to be subsequently reproduced and a second reproducing control device which controls reproducing of a plurality of pieces of program information recorded on the second recording medium, and which is detachably connected with the information recording/reproducing apparatus, wherein the information recording/reproducing apparatus comprises: an information erasing and copying device which, when the reproducing of the piece of program information is ended, erases the piece of program information from the second recording medium, and then newly copies a piece of program information to be reproduced after said at least one piece of program information, from the first recording medium to the second recording medium.

According to the present invention, the program information to be reproduced is copied from the first recording medium to the second recording medium in such a way that the program information recorded on the second recording medium is replaced in time with the end of reproducing of program information. Consequently, for example, when the user stops reproducing program information from the first recording medium, removes the portable information recording/reproducing apparatus from the information recording/reproducing apparatus, and uses it as a portable player, there is no need for the user to select the program information he/she intends to reproduce and record it on the second recording medium and the user can reproduce it easily from the portable information recording/reproducing apparatus. Thus, this invention can reduce troublesome user tasks and improve convenience.

The above object of the present invention can be achieved by an information recording/reproducing system provided with: an information recording/reproducing apparatus having a first reproducing control device which controls reproducing of a plurality of pieces of program information recorded on a first recording medium; and a portable information recording/reproducing apparatus which has a second recording medium and a second reproducing control device which controls reproducing of a plurality of pieces of program information recorded on the second recording medium, and which is detachably connected with the information recording/reproducing apparatus, wherein the portable information recording/reproducing apparatus comprises: an information copying device which, when predetermined a piece of program information is reproduced from the first recording medium, copies the piece of program information and at least one piece of program information to be subsequently reproduced, from the first recording medium to the second recording medium, and an information erasing and copying device which, when the reproducing of the piece of program information is ended, erases the piece of program information from the second recording medium, and then newly copies a piece of program information to be reproduced after said at least one piece of program information, from the first recording medium to the second recording medium.

According to the present invention, information copying device and information erasing and copying device may be provided with the portable information recording/reproducing apparatus.

The above object of the present invention can be achieved by an information recording/reproducing system provided with: an information recording/reproducing apparatus having a first reproducing control device which controls reproducing of a plurality of pieces of program information recorded on a first recording medium; and a portable information recording/reproducing apparatus which has a second recording medium for recording a piece of program information currently being reproduced from the first recording medium and at least one piece of program information to be subsequently reproduced and a second reproducing control device which controls reproducing of a plurality of pieces of program information recorded on the second recording medium, and which is detachably connected with the information recording/reproducing apparatus, wherein the portable information recording/reproducing apparatus comprises: an information erasing and copying device which, when the reproducing of the piece of program information is ended, erases the piece of program information from the second recording medium, and then newly copies a piece of program information to be reproduced after said at least one piece of program information, from the first recording medium to the second recording medium.

According to the present invention, information copying device and information erasing and copying device may be provided with the portable information recording/reproducing apparatus.

In one aspect of the information recording/reproducing system of the present invention, the first recording medium has a larger record capacity than the second recording medium.

The above object of the present invention can be achieved by a music recording/reproducing system provided with: a music recording/reproducing apparatus having a first reproducing control device which controls reproducing of a plurality of pieces of music data recorded on a first recording medium and a portable music recording/reproducing apparatus which has a second recording medium and a second reproducing control device which controls reproducing of a plurality of pieces of music data recorded on the second recording medium, and which is detachably connected with the music recording/reproducing apparatus, wherein the music recording/reproducing apparatus comprises: a check-out device which, when a predetermined a piece of music data is reproduced from the first recording medium, checks out the piece of music data and at least one piece of music data to be subsequently reproduced, from the first recording medium to the second recording medium, and a check-in/out device which, when the reproducing of the piece of music data is ended, checks in the piece of music data from the second recording medium to the first recording medium, and then newly checks out a piece of music data to be reproduced after said at least one piece of music data, from the first recording medium to the second recording medium.

According to the present invention, the music data to be reproduced are checked out from the first recording medium to the second recording medium in such away that a music data recorded on the second recording medium is replaced in time with the end of reproducing of the music data. Consequently, when the user stops reproducing (playing back) the music data (musical piece) from the first recording medium, removes the portable music recording/reproducing apparatus from the music recording/reproducing apparatus, and uses it as a portable player, there is no need for the user to select the music data (musical piece) he/she intends to listen to and check it out to the second recording medium and the user can listen to it easily on the portable music recording/ reproducing apparatus.

The above object of the present invention can be achieved by a music recording/reproducing system provided with: a music recording/reproducing apparatus having a first reproducing control device which controls reproducing of a plurality of pieces of music data recorded on a first recording medium; and a portable music recording/reproducing apparatus which has a second recording medium for recording a piece of music data currently being reproduced from the first recording medium and at least one piece of music data to be subsequently reproduced and a second reproducing control device which controls reproducing of a plurality of pieces of music data recorded on the second recording medium, and which is detachably connected with the music recording/ reproducing apparatus, wherein the music recording/reproducing apparatus comprises: a check-in/out device which, when the reproducing of the piece of music data is ended, checks in the piece of the music data from the second recording medium to the first recording medium, and then newly checks out a piece of music data to be reproduced after said at least one piece of music data, from the first recording medium to the second recording medium.

According to the present invention, the music data to be reproduced are checked out from the first recording medium to the second recording medium in such a way that a music data recorded on the second recording medium is replaced in time with the end of reproducing of the music data. Consequently, when the user stops reproducing (playing back) the music data (musical piece) from the first recording medium, removes the portable music recording/reproducing apparatus from the music recording/reproducing apparatus, and uses it as a portable player, there is no need for the user to select the music data (musical piece) he/she intends to listen to and check it out to the second recording medium and the user can listen to it easily on the portable music recording/ reproducing apparatus.

In one aspect of the music recording/reproducing system of the present invention, the first recording medium has a larger record capacity than the second recording medium.

The above object of the present invention can be achieved by an information recorded medium wherein a program for a computer in a music recording/reproducing system which controls reproducing of a plurality of pieces of music data recorded on a first recording medium and controls reproducing of a plurality of pieces of music data recorded on a second recording medium, is recorded so as to be read by the computer, the program makes the computer function as: when a predetermined a piece of music data is reproduced from the first recording medium, checking out the piece of music data and at least one piece of music data to be subsequently reproduced, from the first recording medium to the second recording medium, and when the reproducing of the piece of music data is ended, checking in the piece of music data from the second recording medium to the first recording medium, and then newly checking out a piece of music data to be reproduced after said at least one piece of music data, from the first recording medium to the second recording medium.

The above object of the present invention can be achieved by an information recorded medium wherein a program for a computer in a music recording/reproducing system which controls reproducing of a plurality of pieces of music data recorded on a first recording medium and controls reproducing of a plurality of pieces of music data recorded on a second recording medium, is recorded so as to be read by the computer, the program makes the computer function as: when the reproducing of the piece of music data is ended, checking in the piece of the music data from the second recording medium to the first recording medium, and then newly checking out a piece of music data to be reproduced after at least one piece of music data recorded on the second recording medium, from the first recording medium to the second recording medium.

The above object of the present invention can be achieved by a music recording/reproducing method for a music recording/reproducing system which includes: a music recording/reproducing apparatus for controlling reproducing of a plurality of pieces of music data recorded on a first recording medium; and a portable music recording/reproducing apparatus for controlling reproducing of a plurality of pieces of music data recorded on the second recording medium, and which is detachably connected with the music recording/reproducing apparatus, wherein the music recording/reproducing method comprises: a process of, when a predetermined a piece of music data is reproduced from the first recording medium, checking out the piece of music data and at least one piece of music data to be subsequently reproduced, from the first recording medium to the second recording medium, and a process of, when the reproducing of the piece of music data is ended, checking in the piece of music data from the second recording medium to the first recording medium, and then newly checking out a piece of music data to be reproduced after said at least one piece of music data, from the first recording medium to the second recording medium.

DETAILED DESCRIPTION OF THE PREFERRED EMBODIMENTS

A preferred embodiment of the present invention will be described with reference to the accompanying drawings. Incidentally, described below is an embodiment in which an information recording/reproducing system according to the present invention is applied to an in-vehicle audio system. In the following description, music data on which the number of allowed copies is limited based on the known SDMI (Secure Digital Music Initiative) standard will be cited as an example of program information according to the present invention.

First, configuration and functions of the in-vehicle audio system according to this embodiment will be described with reference to FIGS. 1 and 2.

Figure 1:
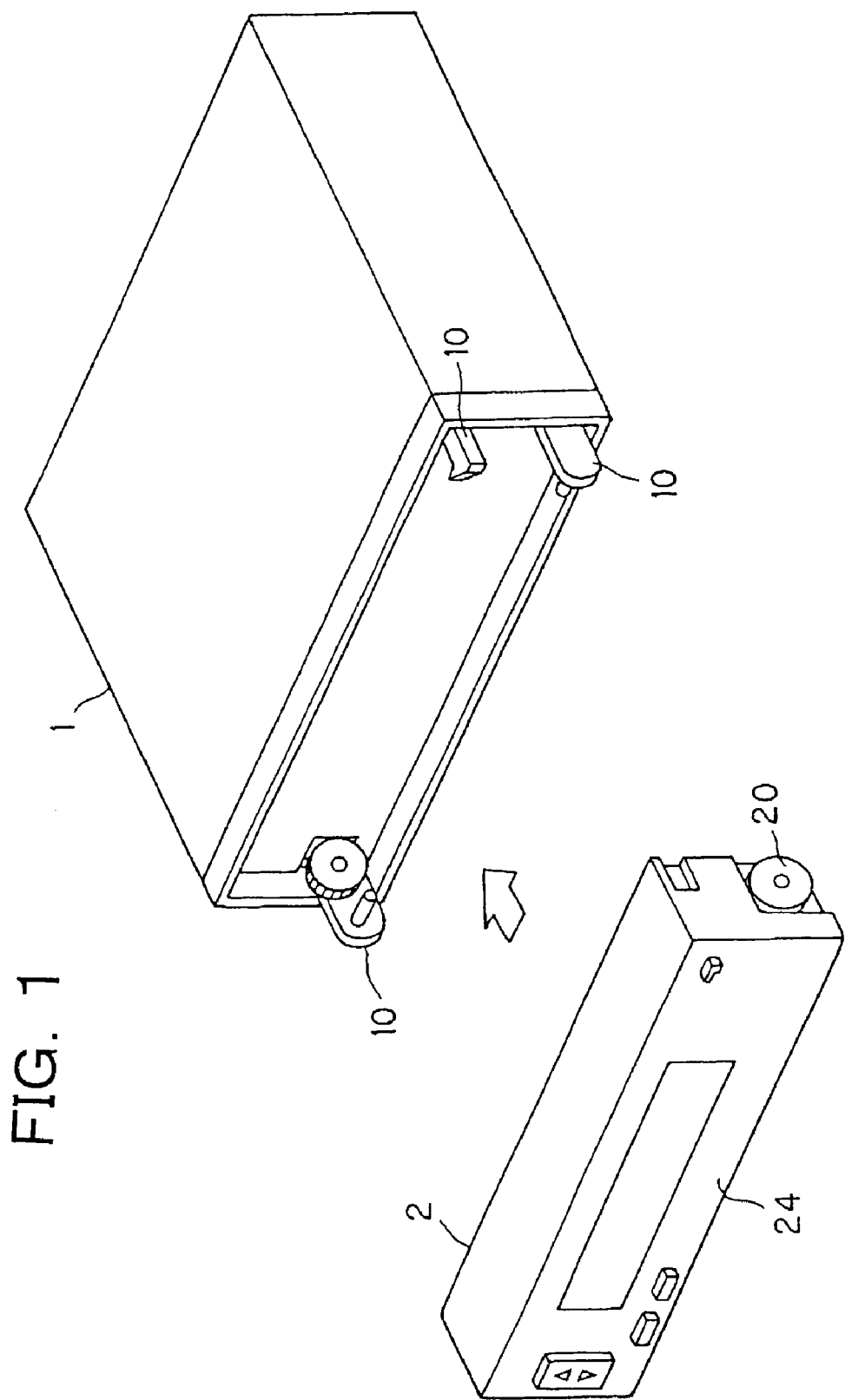
FIG. 1 is an external configuration example of an in-vehicle audio system according to an embodiment of the present invention.

FIG. 1 is an external configuration example of the in-vehicle audio system according to this embodiment. As shown in FIG. 1, the in-vehicle audio system 100 chiefly includes a main unit (a body of the audio system 100) 1 as an information recording/reproducing apparatus and a detachable operation panel 2 as a portable information recording/reproducing apparatus detachable from the main unit 1. An engaging member 10 is provided on the front face of the main unit 1 and an engaged member 20 is provided on the rear face of the detachable operation panel 2. When the engaged member 20 is engaged with the engaging member 10, the detachable operation panel 2 is mounted on (held to) the main unit 1.

Although not shown, a detach connector each is provided on the front of the main unit 1 and the rear of the detachable operation panel 2. When the detach connectors are coupled, the main unit 1 and detachable operation panel 2 are connected electrically to allow transmission and reception of music data.

Figure 2:
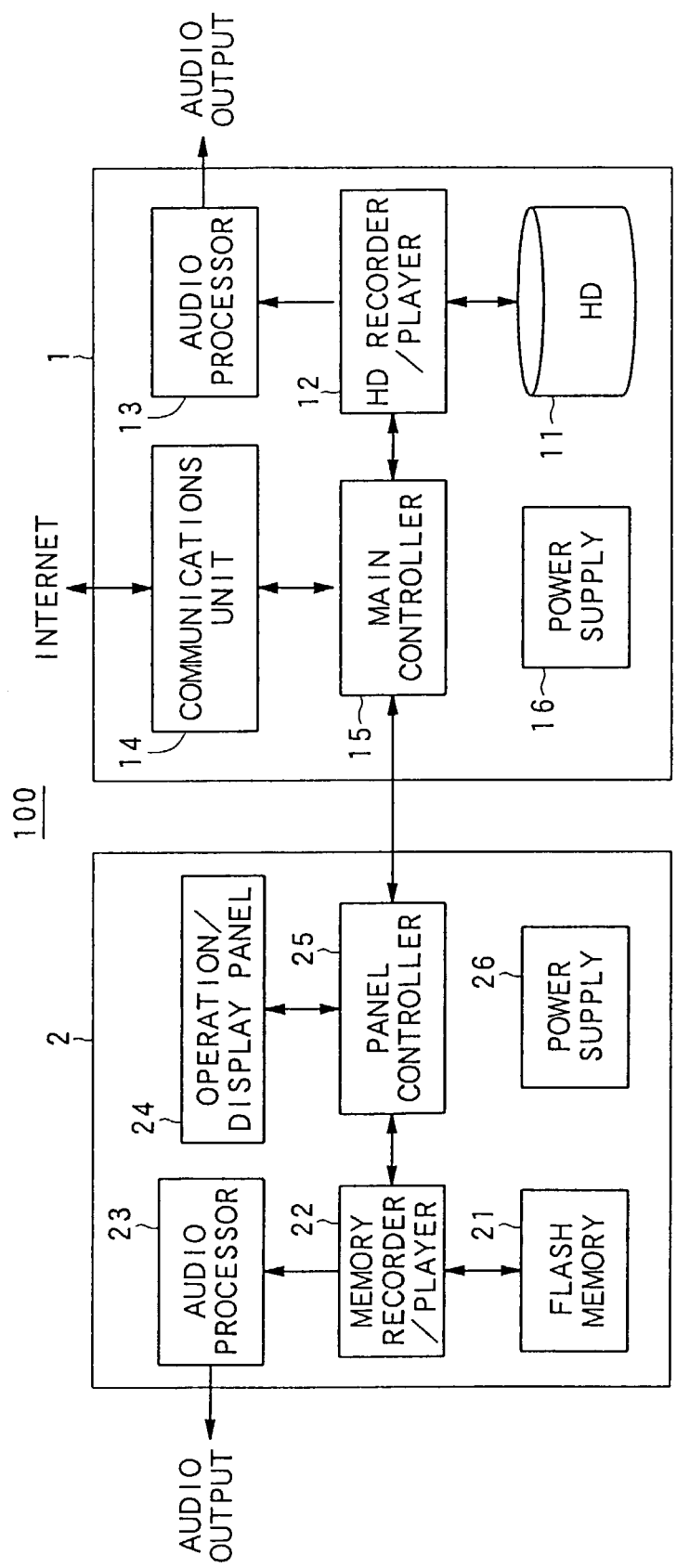
FIG. 2 is an exemplary schematic block diagram of the in-vehicle audio system 100 according to this embodiment.

FIG. 2 is an exemplary schematic block diagram of the in-vehicle audio system 100 according to this embodiment.

As shown in FIG. 2, the main unit 1 includes an HD (hard disk) 11 as a first recording device, a HD recorder/player 12 which records music data on the HD 11 and reproduces the music data from the HD 11, an audio processor 13 which performs audio processing on the music data reproduced by the HD recorder/player 12 and outputs it, a communications unit 14 for connecting to the Internet via a mobile communications network, a main controller 15 which controls the above components, and power supply 16 which supplies power to the above components.

A plurality of pieces of music data is recorded on the HD 11. These music data are constituted, for example, by digital information distributed from a known EDM (Electronic Music Distribution) server on the Internet. To limit the number of copies, the number of allowed copies is assigned to each music data.

Incidentally, although the HD 11 has been cited as an example of a first recording medium, the first recording medium is not limited to the HD 11 and may be CD-R, DVD-R/W, or other recording media.

The HD recorder/player 12 includes an HDD (HardDiskDrive) a buffer memory, etc. The HDD drive records music data on the HD 11 and reproduces music data from the HD 11 under instructions from the main controller 15. During these processes, the music data are stored temporarily in the buffer memory.

The audio processor 13 includes a decoder, a DAC (Digital-to-Analog Converter), AMP (Amplifier), and speaker, etc. The music data reproduced by the HD recorder/player 12 is decompressed by the decoder and converted into analog sound signals by the DAC. Then, it is amplified by the AMP and outputted as voice (music) through the speaker.

The main controller 15 includes a CPU as a computer equipped with arithmetic capabilities, working RAM, ROM which stores various processing programs and data including a music recording/reproducing program, etc. As a first reproducing control device, it controls reproducing operation of the HD recorder/player 12. Also, the main controller 15 accesses EMD server and acquires music data from the EDM server via a mobile communications network and the Internet. Also, the main controller 15 controls the HD recorder/player 12 so as to record the acquired music data on the HD 11. Such control is performed based on instruction from the user entered through a operation/display panel 24 and a panel controller 25 mounted on the detachable operation panel 2.

Also, the main controller 15 detects whether the main unit 1 and detachable operation panel 2 are electrically connected via the detach connectors.

Furthermore, the main controller 15 has host capabilities: it manages the form and history of copying for music data based on the SDMI standard described above, permits copying within the number of allowed copies assigned to each music data, and prohibits copying in excess of the number of allowed copies. The process of copying the music data from a recording medium to another recording medium within the number of allowed copies assigned to the music data is referred to as check-out while the process of returning the checked-out music data to the original recording medium is referred to as check-in. Each time the music data is checked out, the number of allowed copies is decremented by one and each time the music data is checked in, the number of allowed copies is incremented by one.

Besides, the CPU of the main controller 15 functions as a check-out device and a check-in/out device of the present invention. Details of these functions will be described later.

As shown in FIG. 2, the detachable operation panel 2 includes a flash memory (e.g., memory stick) 21 as a second recording medium, a memory recorder/player 22 which records music data on the flash memory 21 and reproduces the music data from the flash memory 21, an audio processor 23 which performs audio processing on the music data reproduced by the memory recorder/player 22 and outputs it, an operation/display panel 24 which accepts instruction from user through operation button and outputs it to the panel controller 25 as well as displays predetermined information, the panel controller 25 which controls the above components, and a power supply (e.g., known rechargeable battery) 26 which supplies power to the above components.

A plurality of pieces of music data checked out from the HD 11 is recorded on the flash memory 21. Since the flash memory 21 has a smaller record capacity than does the HD 11, only part out of a plurality of pieces of the music data recorded on the HD 11 is checked out and recorded on the flash memory 21.

At the time of check-out, the memory recorder/player 22 records music data on the flash memory 21 under instruction from the panel controller 25. Also, the memory recorder/player 22 reproduces the music data recorded on the flash memory 21 under instruction from the panel controller 25. At the time of check-in, the memory recorder/player 22 erases the music data recorded on the flash memory 21 under instruction from the panel controller 25.

The audio processor 23 includes a decoder, a DAC, and an AMP, etc. The music data reproduced by the memory recorder/player 22 is decompressed by the decoder, converted into analog sound signals by the DAC, and amplified by the AMP. The amplified sound signals are output, for example, to a headphone through an external connection terminal on the detachable operation panel 2.

The panel controller 25 includes a CPU which has arithmetic capabilities, a working RAM, a ROM which stores various processing programs and data, etc. It transmits instructions received from the user via the operation/display panel 24 to the main controller 15 of the main unit 1, outputs predetermined information to be displayed (e.g., titles of music data, track numbers, etc.) to the operation/display panel 24, and controls display.

At the time of check-out, the panel controller 25 controls the memory recorder/player 22 so as to record the music data received from the main unit 1 on the flash memory 21, under instruction from the main controller 15 of the main unit 1. At the time of check-in, it conveys the instruction of check-in to the main controller 15 of the main unit 1 and controls the memory recorder/player 22 so as to erase the music data checked-in from the flash memory 21.

When the detachable operation panel 2 is detached from the main unit 1, i.e., when it is used as a portable player, the panel controller 25 as a second reproducing control device controls the reproducing operation of the memory recorder/player 22 under instruction from the user via the operation/display panel 24.

With the above configuration, when a predetermined piece of music data (e.g., piece of music data specified by the user) is reproduced from the HD 11, the main controller 15 of the main unit 1 checks out the piece of music data and at least one piece of music data to be subsequently reproduced from the HD 11 to the flash memory 21. When the reproducing of the piece of music data is ended, the main controller 15 of the main unit 1 checks in the piece of music data to the HD 11 and then newly checks out a piece of music data to be reproduced after checked-out music data, from the HD 11 to the flash memory 21.

Next, the main controller 15 of the main unit 1 will be described in detail with reference to FIGS. 3 and 4.

Figure 3:
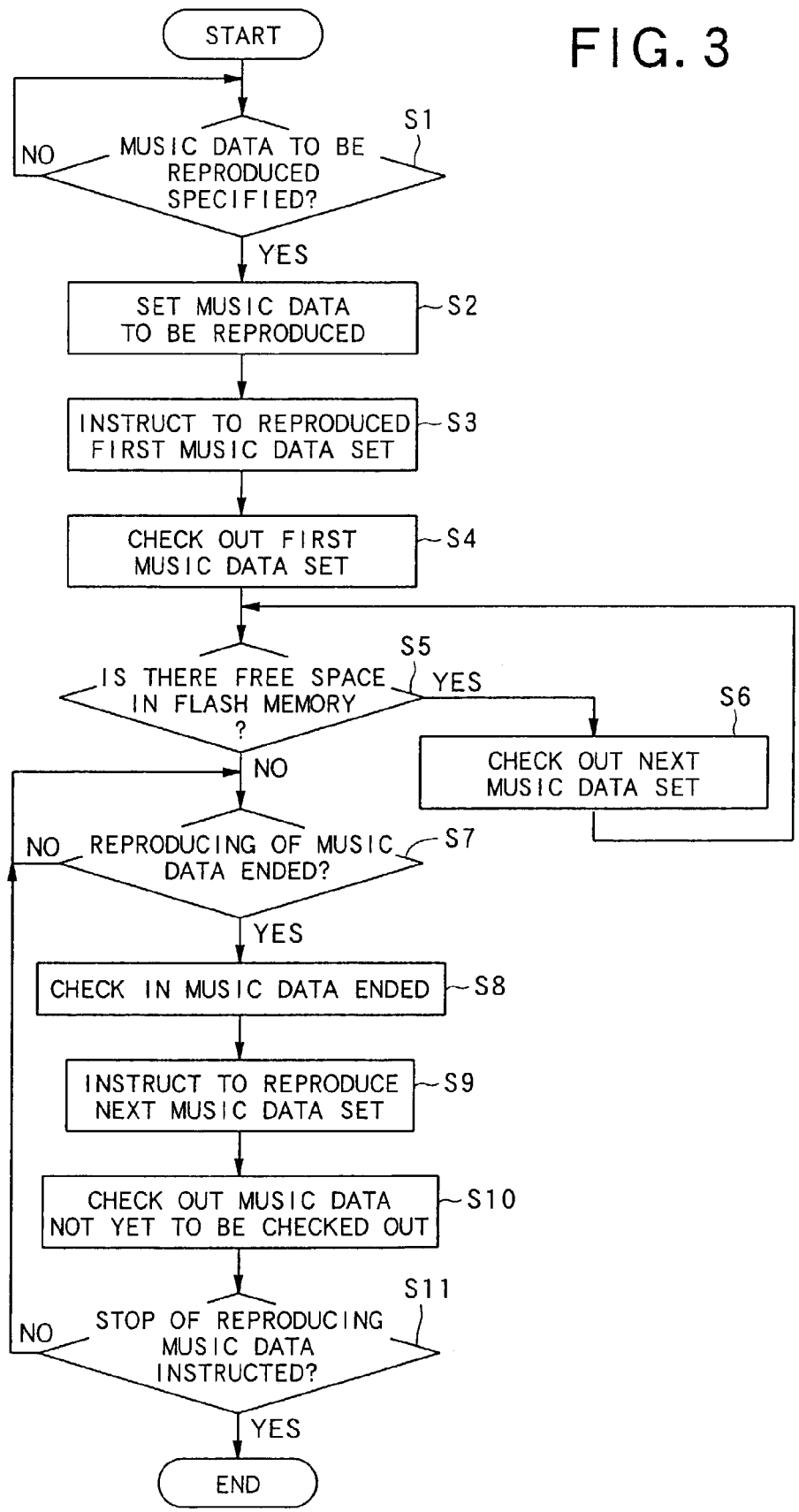
FIG. 3 is a flowchart of processes performed by a main controller 15 when predetermined music data is reproduced from an HD 11.
Figure 4A:
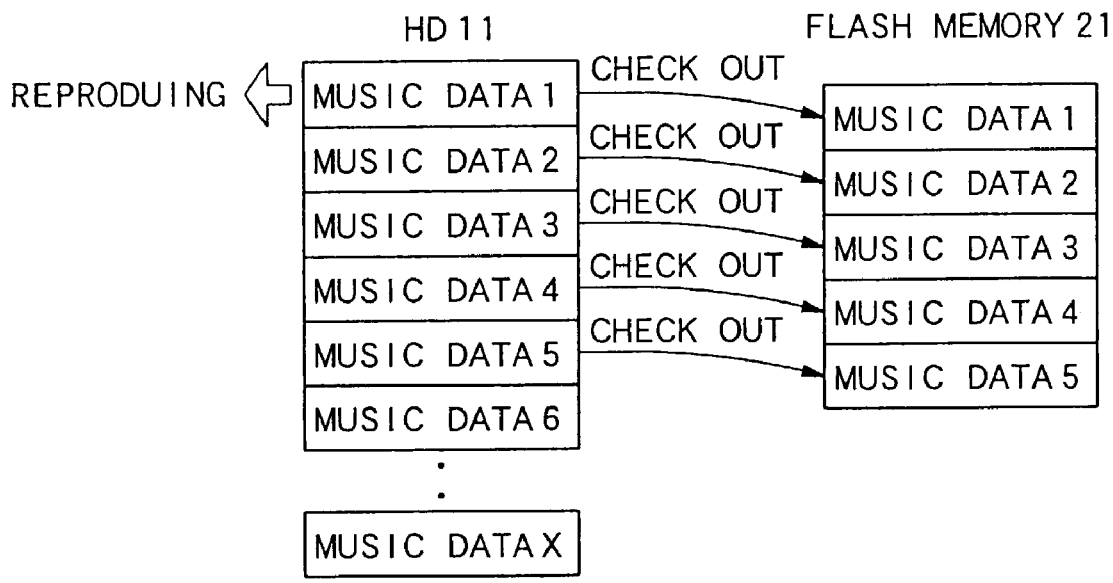
FIGS. 4A and 4B are a conceptual diagram showing how a plurality of pieces of music data are checked out and checked in when the processes in FIG. 3 are performed.
Figure 4A:
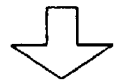
Figure 4B:
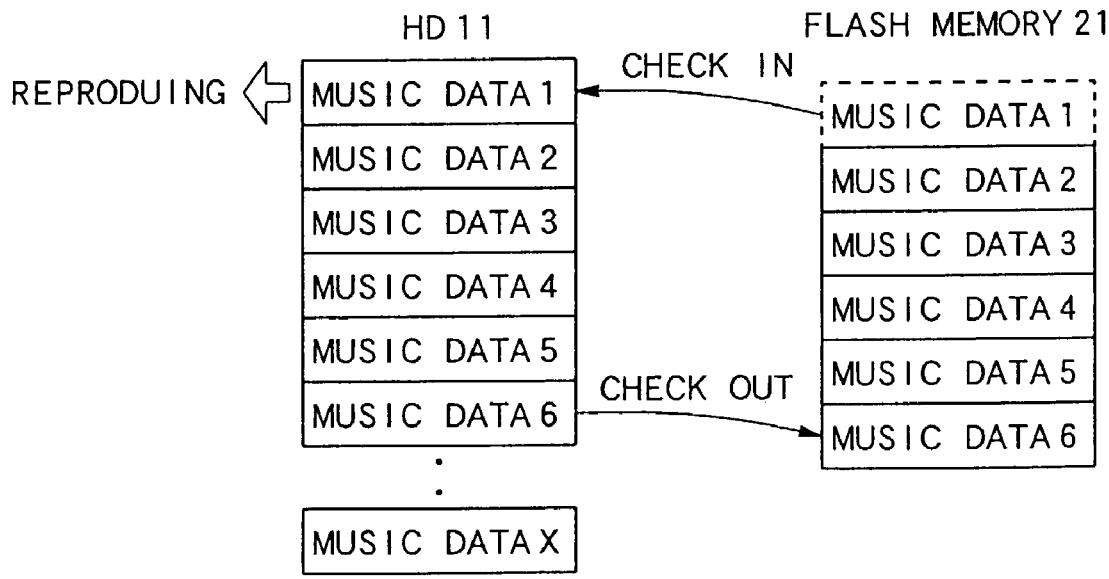

FIG. 3 is a flowchart of processes performed by the main controller 15 when predetermined music data are reproduced from the HD 11. FIGS. 4A and 4B are a conceptual diagram showing how a plurality of pieces of music data are checked out and checked in when the processes in FIG. 3 are performed.

When the main controller 15 detects that the main unit 1 and detachable operation panel 2 are connected electrically, it is ready to receive instruction from the detachable operation panel 2.

Referring to FIG. 3, when the user specifies one or more desired piece of music data out of a plurality of pieces of the music data recorded on the HD 11 by operating the operation/display panel 24, the main controller 15 responds thereto (Step S1) and sets a plurality of pieces of music data to be reproduced (Step S2). For example, in the case of normal continuous reproducing, it sets one piece of music data specified by the user and a plurality of subsequent pieces of music data recorded on the HD 11. In the case of so-called programmed reproducing, it sets a plurality of pieces of music data specified by the user.

Then, the main controller 15 instructs the HD recorder/player 12 to reproduce the first piece of music data which has been set (Step S3). The music data is reproduced from the HD 11 and output as voice (music) via the audio processor 13. Also, the main controller 15 notifies the panel controller 25 of the detachable operation panel 2 of the last address.

The main controller 15 checks out the piece of the music data (music data accumulated in the buffer memory of the HD recorder/player 12) reproduced from the HD 11, to the flash memory 21 via the panel controller 25 and memory recorder/player 22 (Step S4) That is, the main controller 15 outputs piece of the music data to the panel controller 25 and gives instruction of the check-out to the panel controller 25. Consequently, the panel controller 25 controls the memory recorder/player 22 so as to record the piece of music data on the flash memory 21, and thus the music data is recorded on (in) the flash memory 21. Also, the main controller 15 decrements the number of allowed copies for the checked-out piece of music data by one.

Then, the main controller 15 checks the flash memory 21 for free space (Step S5). Information as to whether free space is available is acquired from the panel controller 25. If free space is available in the flash memory 21, the main controller 15 checks out the next piece of music data which has been set, i.e., piece of the music piece to be reproduced after piece of the music data currently being reproduced, to the flash memory 21 via the panel controller 25 and memory recorder/player 22 (Step S6). Specifically, the main controller 15 controls the HD recorder/player 12 so as to read the next piece of music data from the HD 11 and accumulate it in a buffer memory (e.g., a buffer memory different from the one which contains piece of the music data currently being reproduced) as necessary, outputs it to the panel controller 25 as is the case with the first piece of music data, and gives instruction of the check-out to the panel controller 25.

The main controller 15 repeats the process in Step S6 until no free space is available in the flash memory 21. As shown in FIG. 4A, from a plurality of pieces of the music data which were set in Step S2 ("music data 1" to "music data X" in the example of FIG. 4A), the first piece of music data (music data 1) to the fifth piece of music data (music data 5) are checked out from the HD 11 to the flash memory 21.

Then, the main controller 15 judges whether the reproducing of the first piece of music data is ended (Step S7). If the reproducing is ended, the main controller 15 checks in the piece of music data ended to the HD 11 (Step S8). Specifically, the main controller 15 gives instruction of the check-in to the panel controller 25. Consequently, the panel controller 25 controls the memory recorder/player 22 so as to erase the piece of music data from the flash memory 21, and thus the piece of music data is erased from the flash memory 21. Also, the main controller 15 increments the number of allowed copies for the checked-in piece of music data by one.

Then, the main controller 15 instructs the HD recorder/player 12 to reproduce the next piece of music data which has been set, i.e., the piece of music data to be reproduced after the first piece of music data (Step S9). Consequently, the music data is reproduced from the HD 11 and output as voice via the audio processor 13. Also, the main controller 15 updates the last address and notifies the panel controller 25 of the detachable operation panel 2 of the last address.

Then, from a plurality of pieces of the music data which have been set above, the main controller 15 checks out the piece of the music data not yet to be checked out, to the flash memory 21 via the panel controller 25 and memory recorder/player 22 (Step S10). Specifically, as shown in FIG. 4B, when "music data 1" is checked in, free space becomes available in the flash memory 21 and "music data 6" is checked out to the free space. Incidentally, before checking out "music data 6," the main controller 15 may judge whether enough free space is available to record "music data 6."

The processes in Steps S7 to S10 are repeated until the user gives instruction to stop reproducing on the operation/display panel 24 or until all piece of the music data which were set in Step S2 have been reproduced (Step S11). In other words, the piece of music data recorded on the flash memory 21 is replaced one by one as the piece of music data from the HD 11 ends being reproduced. If, for example, the user gives instruction to stop reproducing on the operation/display panel 24 while the piece of music data is being reproduced, the flash memory 21 contains this piece of music data and at least one piece of music data to be reproduced subsequently. Then, if the user removes the detachable operation panel 2 from the main unit 1 and uses it as a portable player when he/she gets off the vehicle, he/she can reproducing music data beginning with the one he/she was listening to in the vehicle. In short, based on the most recent last address notified from the main controller 15 of the main unit 1, the panel controller 25 of the detachable operation panel 2 identifies the piece of music data being reproduced last by the main unit 1 and reproduces this piece of music data from the beginning.

Incidentally, if the detachable operation panel 2 comes off the main unit 1 during reproducing, the main controller 15 detects it and stops the reproducing. In that case, based on the most recent last address notified from the main controller 15, the panel controller 25 of the detachable operation panel 2 can identify the piece of music data being reproduced on the main unit 1 when the reproducing stopped.

As described above, according to this embodiment, a plurality of pieces of the music data to be reproduced are checked out from the HD 11 to the flash memory 21, and the piece of the music data recorded in the flash memory 21 is replaced one by one as each piece of music data from the HD 11 ends being reproduced. Consequently, when the user stops reproducing a music from the HD 11, removes the detachable operation panel 2 from the main unit 1, and uses it as a portable player, there is no need for the user to select the music he/she intends to listen to and check it out to the flash memory 21 and the user can listen to it easily on the detachable operation panel 2.

Incidentally, in the above embodiment, the processes in Steps S4 to S6 are performed after the first piece of music data which was set in Step S3 in FIG. 3 is reproduced. Alternatively, the processes in Steps S4 to S6 may be performed before the process in Step S3.

Also, although music data have been cited as an example of program information in the above embodiment, the program information is not limited to this and may also be applied to video data and the like.

Also, in the above embodiment, the information recording/reproducing system is applied to the in-vehicle audio system 100 where the main unit 1 is used as the information recording/reproducing apparatus and the detachable operation panel 2 is used as the portable information recording/reproducing apparatus. However, the present invention is not limited to this. The information recording/reproducing apparatus may be a personal computer or home audio apparatus and the portable information recording/reproducing apparatus may be a cell phone, portable MD player, or portable CD player.

Also, although music data to which the number of allowed copies is assigned based on the SDMI standard have been cited as an example in the above embodiment, the present invention is not limited to this. If music data to which the number of allowed copies is not assigned is cited, the check-out device described above becomes information copying device and the check-in/out device described above becomes information erasing and copying device.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2002-158791 filed on May 31, 2002 including the specification, claims, drawings and summary is incorporated herein by reference in its entirety.

What is claimed is:

1. An information recording/reproducing system comprising:
    an information recording/reproducing apparatus having a first reproducing control device which controls reproducing of a plurality of pieces of program information recorded on a first recording medium; and
    a portable information recording/reproducing apparatus which has a second recording medium and a second reproducing control device which controls reproducing of a plurality of pieces of program information recorded on the second recording medium, and which is detachably connected with the information recording/reproducing apparatus,
    wherein the information recording/reproducing apparatus comprises:
    an information copying device which, when predetermined a piece of program information is reproduced from the first recording medium, copies the piece of program information and at least one piece of program information to be subsequently reproduced, from the first recording medium to the second recording medium, and
    an information erasing and copying device which, when the reproducing of the piece of program information is ended, erases the piece of program information from the second recording medium, and then newly copies a piece of program information to be reproduced after said at least one piece of program information, from the first recording medium to the second recording medium.

2. The information recording/reproducing system according claim 1, wherein the first recording medium has a larger record capacity than the second recording medium.

3. An information recording/reproducing system comprising:
    an information recording/reproducing apparatus having a first reproducing control device which controls reproducing of a plurality of pieces of program information recorded on a first recording medium; and
    a portable information recording/reproducing apparatus which has a second recording medium for recording a piece of program information currently being reproduced from the first recording medium and at least one piece of program information to be subsequently reproduced and a second reproducing control device which controls reproducing of a plurality of pieces of program information recorded on the second recording medium, and which is detachably connected with the information recording/reproducing apparatus,
    wherein the information recording/reproducing apparatus comprises:
    an information erasing and copying device which, when the reproducing of the piece of program information is ended, erases the piece of program information from the second recording medium, and then newly copies a piece of program information to be reproduced after said at least one piece of program information, from the first recording medium to the second recording medium.

4. The information recording/reproducing system according claim 3, wherein the first recording medium has a larger record capacity than the second recording medium.

5. An information recording/reproducing system comprising:
    an information recording/reproducing apparatus having a first reproducing control device which controls reproducing of a plurality of pieces of program information recorded on a first recording medium; and
    a portable information recording/reproducing apparatus which has a second recording medium and a second reproducing control device which controls reproducing of a plurality of pieces of program information recorded on the second recording medium, and which is detachably connected with the information recording/reproducing apparatus,
    wherein the portable information recording/reproducing apparatus comprises:
    an information copying device which, when predetermined a piece of program information is reproduced from the first recording medium, copies the piece of program information and at least one piece of program information to be subsequently reproduced, from the first recording medium to the second recording medium, and
    an information erasing and copying device which, when the reproducing of the piece of program information is ended, erases the piece of program information from the second recording medium, and then newly copies a piece of program information to be reproduced after said at least one piece of program information, from the first recording medium to the second recording medium.

6. The information recording/reproducing system according claim 5, wherein the first recording medium has a larger record capacity than the second recording medium.

7. An information recording/reproducing system comprising:
    an information recording/reproducing apparatus having a first reproducing control device which controls reproducing of a plurality of pieces of program information recorded on a first recording medium; and
    a portable information recording/reproducing apparatus which has a second recording medium for recording a piece of program information currently being reproduced from the first recording medium and at least one piece of program information to be subsequently reproduced and a second reproducing control device which controls reproducing of a plurality of pieces of program information recorded on the second recording medium, and which is detachably connected with the information recording/reproducing apparatus,
    wherein the portable information recording/reproducing apparatus comprises:
    an information erasing and copying device which, when the reproducing of the piece of program information is ended, erases the piece of program information from the second recording medium, and then newly copies a piece of program information to be reproduced after said at least one piece of program information, from the first recording medium to the second recording medium.

8. The information recording/reproducing system according claim 7, wherein the first recording medium has a larger record capacity than the second recording medium.

9. A music recording/reproducing system comprising:
a music recording/reproducing apparatus having a first reproducing control device which controls reproducing of a plurality of pieces of music data recorded on a first recording medium; and
a portable music recording/reproducing apparatus which has a second recording medium and a second reproducing control device which controls reproducing of a plurality of pieces of music data recorded on the second recording medium, and which is detachably connected with the music recording/reproducing apparatus,
wherein the music recording/reproducing apparatus comprises:
a check-out device which, when a predetermined a piece of music data is reproduced from the first recording medium, checks out the piece of music data and at least one piece of music data to be subsequently reproduced, from the first recording medium to the second recording medium, and
a check-in/out device which, when the reproducing of the piece of music data is ended, checks in the piece of music data from the second recording medium to the first recording medium, and then newly checks out a piece of music data to be reproduced after said at least one piece of music data, from the first recording medium to the second recording medium.

10. The music recording/reproducing system according to claim 9, wherein the first recording medium has a larger record capacity than the second recording medium.

11. A music recording/reproducing system comprising:
a music recording/reproducing apparatus having a first reproducing control device which controls reproducing of a plurality of pieces of music data recorded on a first recording medium; and
a portable music recording/reproducing apparatus which has a second recording medium for recording a piece of music data currently being reproduced from the first recording medium and at least one piece of music data to be subsequently reproduced and a second reproducing control device which controls reproducing of a plurality of pieces of music data recorded on the second recording medium, and which is detachably connected with the music recording/reproducing apparatus,
wherein the music recording/reproducing apparatus comprises:
a check-in/out device which, when the reproducing of the piece of music data is ended, checks in the piece of the music data from the second recording medium to the first recording medium, and then newly checks out a piece of music data to be reproduced after said at least one piece of music data, from the first recording medium to the second recording medium.

12. The music recording/reproducing system according to claim 11, wherein the first recording medium has a larger record capacity than the second recording medium.

13. A music recording/reproducing apparatus in a music recording/reproducing system which comprises:
a music recording/reproducing apparatus having a first reproducing control device which controls reproducing of a plurality of pieces of music data recorded on a first recording medium; and
a portable music recording/reproducing apparatus which has a second recording medium and a second reproducing control device which controls reproducing of a plurality of pieces of music data recorded on the second recording medium, and which is detachably connected with the music recording/reproducing apparatus,
wherein the music recording/reproducing apparatus comprises:
a check-out device which, when a predetermined a piece of music data is reproduced from the first recording medium, checks out the piece of music data and at least one piece of music data to be subsequently reproduced, from the first recording medium to the second recording medium, and
a check-in/out device which, when the reproducing of the piece of music data is ended, checks in the piece of music data from the second recording medium to the first recording medium, and then newly checks out a piece of music data to be reproduced after said at least one piece of music data, from the first recording medium to the second recording medium.

14. A music recording/reproducing apparatus in a music recording/reproducing system which comprises:
a music recording/reproducing apparatus having a first reproducing control device which controls reproducing of a plurality of pieces of music data recorded on a first recording medium; and
a portable music recording/reproducing apparatus which has a second recording medium for recording a piece of music data currently being reproduced from the first recording medium and at least one piece of music data to be subsequently reproduced and a second reproducing control device which controls reproducing of a plurality of pieces of music data recorded on the second recording medium, and which is detachably connected with the music recording/reproducing apparatus,
wherein the music recording/reproducing apparatus comprises:
a check-in/out device which, when the reproducing of the piece of music data is ended, checks in the piece of the music data from the second recording medium to the first recording medium, and then newly checks out a piece of music data to be reproduced after said at least one piece of music data, from the first recording medium to the second recording medium.

15. An information recorded medium wherein a program for a computer in a music recording/reproducing system which controls reproducing of a plurality of pieces of music data recorded on a first recording medium and controls reproducing of a plurality of pieces of music data recorded on a second recording medium, is recorded so as to be read by the computer, the program makes the computer function as:
when a predetermined a piece of music data is reproduced from the first recording medium, checking out the piece of music data and at least one piece of music data to be subsequently reproduced, from the first recording medium to the second recording medium, and
when the reproducing of the piece of music data is ended, checking in the piece of music data from the second recording medium to the first recording medium, and then newly checking out a piece of music data to be reproduced after said at least one piece of music data, from the first recording medium to the second recording medium.

16. An information recorded medium wherein a program for a computer in a music recording/reproducing system which controls reproducing of a plurality of pieces of music data recorded on a first recording medium and controls reproducing of a plurality of pieces of music data recorded on a second recording medium, is recorded so as to be read by the computer, the program makes the computer function as:

when the reproducing of the piece of music data is ended, checking in the piece of the music data from the second recording medium to the first recording medium, and then newly checking out a piece of music data to be reproduced after at least one piece of music data recorded on the second recording medium, from the first recording medium to the second recording medium.

17. A music recording/reproducing method for a music recording/reproducing system which comprises: a music recording/reproducing apparatus for controlling reproducing of a plurality of pieces of music data recorded on a first recording medium; and a portable music recording/reproducing apparatus for controlling reproducing of a plurality of pieces of music data recorded on the second recording medium, and which is detachably connected with the music recording/reproducing apparatus, wherein the music recording/reproducing method comprises:

a process of, when a predetermined a piece of music data is reproduced from the first recording medium, checking out the piece of music data and at least one piece of music data to be subsequently reproduced, from the first recording medium to the second recording medium, and a process of, when the reproducing of the piece of music data is ended, checking in the piece of music data from the second recording medium to the first recording medium, and then newly checking out a piece of music data to be reproduced after said at least one piece of music data, from the first recording medium to the second recording medium.

* * * * *